(12) United States Patent
Kwon et al.

(10) Patent No.: US 10,586,968 B2
(45) Date of Patent: Mar. 10, 2020

(54) CABLE-TYPE SECONDARY BATTERY

(71) Applicant: LG Chem, Ltd., Seoul (KR)

(72) Inventors: Yo-Han Kwon, Daejeon (KR); Suk-In Noh, Daejeon (KR); In-Sung Uhm, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 33 days.

(21) Appl. No.: 15/756,832

(22) PCT Filed: Sep. 5, 2016

(86) PCT No.: PCT/KR2016/009917
§ 371 (c)(1),
(2) Date: Mar. 1, 2018

(87) PCT Pub. No.: WO2017/039419
PCT Pub. Date: Mar. 9, 2017

(65) Prior Publication Data
US 2018/0254462 A1    Sep. 6, 2018

(30) Foreign Application Priority Data

Sep. 3, 2015    (KR) .................. 10-2015-0124981

(51) Int. Cl.
*H01M 2/16*    (2006.01)
*H01M 10/056*    (2010.01)
(Continued)

(52) U.S. Cl.
CPC ........... *H01M 2/1673* (2013.01); *H01M 4/13* (2013.01); *H01M 4/62* (2013.01); *H01M 4/667* (2013.01);
(Continued)

(58) Field of Classification Search
None
See application file for complete search history.

(56) References Cited

U.S. PATENT DOCUMENTS

| 2014/0227572 A1 | 8/2014 | Kwon et al. |
| 2014/0377613 A1 | 12/2014 | Kwon et al. |
| 2016/0133942 A1 | 5/2016 | Kwon et al. |

FOREIGN PATENT DOCUMENTS

| JP | 2001110445 A | 4/2001 |
| KR | 20140047010 A | 4/2014 |

(Continued)

OTHER PUBLICATIONS

Search report from International Application No. PCT/KR2016/009917, dated Dec. 28, 2016.
(Continued)

*Primary Examiner* — Sarah A. Slifka
(74) *Attorney, Agent, or Firm* — Lerner, David, Littenberg, Krumholz & Mentlik, LLP (57) ABSTRACT

The present disclosure provides a cable-type secondary battery which includes: a cable-type electrode assembly comprising an inner electrode and a separation layer surrounding the outer surface of the inner electrode to prevent a short-circuit between electrodes; and a sheet-form outer electrode surrounding the outer surface of the cable-type electrode assembly, and satisfies the mathematical formula of C≥W (wherein C is the circumference of the section perpendicular to the longitudinal direction of the cable-type electrode assembly, and W is the width of the sheet-form outer electrode).

14 Claims, 4 Drawing Sheets

(51) Int. Cl.
*H01M 4/74* (2006.01)
*H01M 4/13* (2010.01)
*H01M 4/62* (2006.01)
*H01M 10/058* (2010.01)
*H01M 10/04* (2006.01)
*H01M 4/78* (2006.01)
*H01M 4/66* (2006.01)
*H01M 10/052* (2010.01)

(52) U.S. Cl.
CPC ............... *H01M 4/74* (2013.01); *H01M 4/78* (2013.01); *H01M 10/0422* (2013.01); *H01M 10/0436* (2013.01); *H01M 10/052* (2013.01); *H01M 10/056* (2013.01); *H01M 10/058* (2013.01)

(56) References Cited

FOREIGN PATENT DOCUMENTS

| KR | 20140132289 A | 11/2014 |
| KR | 20140132306 A | 11/2014 |
| WO | 2015080499 A1 | 6/2015 |

OTHER PUBLICATIONS

Kwon, Yo Han, et al., "Cable-Type Flexible Lithium Ion Battery Based on Hollow Multi-Helix Electrodes." Advanced Materials, vol. 24, No. 38, Revised: Jul. 5, 2012; Published online: Aug. 7, 2012., pp. 5192-5197.

FIG. 6

CABLE-TYPE SECONDARY BATTERY

CROSS-REFERENCE TO RELATED APPLICATIONS

The present application is a national phase entry under 35 U.S.C. § 371 of International Application No. PCT/KR2016/009917 filed on Sep. 5, 2016, published in Korean, which claims priority to Korean Patent Application No. 10-2015-0124981 filed on Sep. 3, 2015 in the Republic of Korea, the disclosures of which are incorporated herein by reference.

TECHNICAL FIELD

The present disclosure relates to a freely deformable cable-type secondary battery. More particularly, the present disclosure relates to a cable-type secondary battery which has improved flexibility while minimizing a distance among an inner electrode, a separation layer and an outer electrode.

BACKGROUND ART

In recent times, a secondary battery refers to a device which converts external electric energy into the form of chemical energy and stores it therein, and then generates electricity as necessary. Such a secondary battery is also called the name of 'rechargeable battery' which means a battery capable of being charged many times. Typical secondary batteries include a lead storage battery, nickel cadmium (Ni—Cd) battery, nickel metal hydride (NiMH) battery, lithium ion (Li-ion) battery and a lithium ion (Li-ion) polymer battery. A secondary battery provides both an economical advantage and an environmental advantage as compared to a disposable primary battery.

Currently, a secondary battery is used for some applications requiring low electric power. For example, such applications include a device that helps starting of a car, portable device, instrument and an uninterruptible power supply system. Recently, development of wireless communication technology leads popularization of a portable device. In addition, there is a tendency to convert many conventional systems into wireless systems. Under these circumstances, there is an exploding demand for secondary batteries. Further, hybrid cars and electric cars have been commercialized with a view to preventing environmental pollution. Such next-generation vehicles adopt secondary batteries to reduce the cost and weight and to increase the service life.

In general, secondary batteries are generally provided as cylindrical, prismatic or pouch-type batteries. This is because secondary batteries are manufactured by installing an electrode assembly including a negative electrode, positive electrode and a separator into a cylindrical or prismatic metal can or a pouch-type case made of an aluminum laminate sheet, and then injecting an electrolyte to the electrode assembly. Therefore, a predetermined space for installing a secondary battery is required essentially. Thus, such cylindrical, prismatic or pouch-like shapes of secondary batteries undesirably function as limitations in developing various types of portable devices. As a result, there is a need for a novel type of secondary battery which allows easy deformation.

In this context, a cable-type secondary battery, which has a significantly larger ratio of length to sectional diameter, has been suggested.

A cable-type secondary battery undergoes deformation frequently due to its purpose of use. As a result, the interval between an electrode and a separation layer is increased so that a problem of degradation of fundamental characteristics, such as life characteristics and output, of a battery may occur.

DISCLOSURE

Technical Problem

The present disclosure is designed to solve the problems of the related art, and therefore the present disclosure is directed to providing a cable-type secondary battery which has improved flexibility while minimizing a distance among an inner electrode, a separator and an outer electrode in order to improve the life characteristics and output of a secondary battery.

Technical Solution

In one aspect of the present disclosure, there is provided a cable-type secondary battery which includes: a cable-type electrode assembly including an inner electrode and a separation layer surrounding the outer surface of the inner electrode to prevent a short-circuit between electrodes; and a sheet-form outer electrode surrounding the outer surface of the cable-type electrode assembly, and satisfies the mathematical formula of C≥W (wherein C is the circumference of the section perpendicular to the longitudinal direction of the cable-type electrode assembly, and W is the width of the sheet-form outer electrode).

Herein, the sheet-form outer electrode may have a strip structure extended in one direction.

In addition, the sheet-form outer electrode may include an outer current collector and an outer electrode active material layer formed on one surface of the outer current collector.

Herein, the outer current collector may be a mesh-form current collector.

In addition, the sheet-form outer electrode may further include a porous first supporting layer formed on the outer electrode active material layer.

Herein, the first supporting layer may be a mesh-form porous membrane or non-woven web.

In addition, the first supporting layer may include any one selected from the group consisting of high density polyethylene, low density polyethylene, linear low density polyethylene, ultrahigh molecular weight polyethylene, polypropylene, polyethylene terephthalate, polybutylene terephthalate, polyester, polyacetal, polyamide, polycarbonate, polyimide, polyetheretherketone, polyether sulfone, polyphenylene oxide, polyphenylene sulfide and polyethylene naphthalate, or a mixture thereof.

In addition, the cable-type secondary battery may further include a conductive material coating layer including a conductive material and a binder on the first supporting layer.

Herein, the conductive material may include any one selected from the group consisting of carbon black, acetylene black, ketjen black, carbon fibers, carbon nanotubes and graphene, or a combination thereof.

In addition, the binder may be any one selected from the group consisting of polyvinylidene fluoride (PVDF), polyvinylidene fluoride-co-hexafluoropropylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxymethyl cellulose, styrene-butadiene rubber, acrylonitrile-styrene-butadiene copolymer and polyimide, or a combination thereof.

In addition, the conductive material coating layer may include the conductive material and the binder mixed at a weight ratio of 80:20-99:1.

Meanwhile, the sheet-form outer electrode may further include a porous coating layer including a mixture of inorganic particles and a binder polymer, on the first supporting layer.

Meanwhile, the sheet-form outer electrode may further include a second supporting layer formed on the other surface of the outer current collector.

Herein, the second supporting layer may be a polymer film which may include any one selected from the group consisting of polyolefin, polyester, polyimide and polyamide, or a combination thereof.

In addition, the sheet-form outer electrode layer may further include a conductive layer including a conductive material and a binder, and interposed between the outer electrode active material layer and the first supporting layer.

Herein, the conductive layer may be formed by mixing the conductive material with the binder at a weight ratio of 1:10-8:10.

In addition, the pores formed in the conductive layer may have a size of 0.01-5 μm and a porosity of 5-70%.

Meanwhile, the inner electrode may be provided with at least one inner current collector and an inner electrode active material layer formed on the surface of the inner current collector.

Herein, the inner current collector may further include a primer coating layer including a conductive material and a binder.

In addition, a plurality of intrusions may be formed on at least one surface of the inner current collector, wherein the intrusions may have a continuous pattern or a discontinuous pattern.

Herein, the continuous pattern includes intrusions spaced apart from each other and formed in the longitudinal direction, and the discontinuous pattern may have a plurality of holes.

Herein, the holes may be circular or polygonal holes.

Meanwhile, the inner electrode may include the inner electrode active material layer formed on the whole surface of the inner current collector, or the inner electrode active material layer formed to surround the outer surface of the inner current collector on which it is wound.

In addition, the inner electrode may further include a polymer supporting layer formed on the surface of the inner electrode active material layer.

Herein, the polymer supporting layer may be a porous polymer layer having a pore size of 0.01-10 μm and a porosity of 5-95%.

In addition, the polymer supporting layer may include a polar linear polymer, oxide-based linear polymer or a mixture thereof.

Herein, the polar linear polymer may be any one selected from the group consisting of polyacrylonitrile, polyvinyl chloride, polyvinylidene fluoride (PVDF), polyvinylidene fluoride-co-hexafluoropropylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate and poly-p-phenylene terephthalamide, or a combination thereof.

In addition, the oxide-based linear polymer may be any one selected from the group consisting of polyethylene oxide, polypropylene oxide, polyoxymethylene and polydimethylsiloxane, or a combination thereof.

In addition, the inner current collector may be made of stainless steel, aluminum, nickel, titanium, baked carbon or copper; stainless steel surface-treated with carbon, nickel, titanium or silver; aluminum-cadmium alloy; a non-conductive polymer surface-treated with a conductive material; or a conductive polymer.

Herein, the conductive material may be any one selected from the group consisting of polyacetylene, polyaniline, polypyrrole, polythiophene, polysulfur nitride, indium tin oxide (ITO), silver, palladium and nickel, or a combination thereof.

In addition, the conductive polymer may be any one selected from the group consisting of polyacetylene, polyaniline, polypyrrole, polythiophene and polysulfur nitride, or a combination thereof.

Meanwhile, the outer current collector may further include a primer coating layer including a conductive material and a binder.

In addition, a plurality of intrusions may be formed on at least one surface of the outer current collector, wherein the intrusions may have a continuous pattern or a discontinuous pattern.

In addition, the outer current collector may be made of stainless steel, aluminum, nickel, titanium, baked carbon or copper; stainless steel surface-treated with carbon, nickel, titanium or silver; aluminum-cadmium alloy; a non-conductive polymer surface-treated with a conductive material; a conductive polymer; metal paste including metal powder which is Ni, Al, Au, Pd/Ag, Cr, Ta, Cu, Ba or ITO; or carbon paste containing carbon powder which is graphite, carbon black or a carbon nanotube.

Meanwhile, the inner electrode may have a hollow structure having a space therein.

Herein, the inner electrode may include at least one helically wound wire-form inner current collector or at least one helically wound sheet-form inner current collector. Otherwise, the inner electrode may include at least two helically wound wire-form inner current collectors crossing each other.

In addition, an inner electrode current collector core portion, a lithium ion supplying core portion including an electrolyte or a filler core portion may be formed in the space formed in the inner electrode.

Herein, the inner electrode current collector core portion may be formed of carbon nanotubes; stainless steel; aluminum; nickel; titanium; baked carbon; copper; stainless steel surface-treated with carbon, nickel, titanium or silver; aluminum-cadmium alloy; a non-conductive polymer surface-treated with a conductive material; or a conductive polymer.

In addition, the lithium ion supplying core portion may include a gel polymer electrolyte and a support.

In addition, the lithium ion supplying core portion may include a liquid electrolyte and a porous carrier.

In addition, the electrolyte may be selected from the group consisting of: a non-aqueous electrolyte using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butryolactone, sulfolane, methyl acetate (MA) or methyl propionate (MP); a gel polymer electrolyte using PEO, PVdF, PVdF-HFP, PMMA, PAN or PVAc; and a solid electrolyte using PEO, polypropylene oxide (PPO), polyethylene imine (PEI), polyethylene sulfide (PES) or polyvinyl acetate (PVAC).

In addition, the electrolyte may further include a lithium salt, such as LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lithium lower aliphatic carboxylate or lithium tetraphenylborate, or a mixture thereof.

In addition, the filler core portion includes a polymer resin having a wire-, fiber-, powder-, mesh- or foam-like shape; rubber having a wire-, fiber-, powder-, mesh- or foam-like shape; or an inorganic material having a wire-, fiber-, powder-, mesh- or foam-like shape.

Meanwhile, the inner electrode may be a negative electrode or positive electrode, and the outer electrode may be a positive electrode or negative electrode corresponding thereto.

Herein, when inner electrode is a negative electrode and the outer electrode is a positive electrode, the inner electrode active material may include any one active material particle selected from the group consisting of carbonaceous materials, such as natural graphite and artificial graphite; metals (Me), such as lithium-containing titanium composite oxide (LTO), Si, Sn, Li, Zn, Mg, Cd, Ce, Ni or Fe; alloys of the metals (Me); oxides (MeOx) of the metals (Me); and composites of the metals with carbon, or a mixture thereof, while the outer electrode active material may include any one active material particle selected from the group consisting of LiCoO$_2$, LiNiO$_2$, LiMn$_2$O$_4$, LiCoPO$_4$, LiFePO$_4$, LiNiMnCoO$_2$ and LiNi$_{1-x-y-z}$Co$_x$M1$_y$M2$_z$O$_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and $0 \leq x<0.5$, $0 \leq y<0.5$, $0 \leq z<0.5$, $0<x+y+z \leq 1$), or a mixture thereof.

In addition, when the inner electrode is a positive electrode and the outer electrode is a negative electrode, the inner electrode active material may include any one active material particle selected from the group consisting of LiCoO$_2$, LiNiO$_2$, LiMn$_2$O$_4$, LiCoPO$_4$, LiFePO$_4$, LiNiMnCoO$_2$ and LiNi$_{1-x-y-z}$Co$_x$M1$_y$M2$_z$O$_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and $0 \leq x<0.5$, $0 \leq y<0.5$, $0 \leq z<0.5$, $0<x+y+z \leq 1$), or a mixture thereof, while the outer electrode active material may include any one active material particle selected from the group consisting of carbonaceous materials, such as natural graphite and artificial graphite; metals (Me), such as lithium-containing titanium composite oxide (LTO), Si, Sn, Li, Zn, Mg, Cd, Ce, Ni or Fe; alloys of the metals (Me); oxides (MeOx) of the metals (Me); and composites of the metals with carbon, or a mixture thereof.

Meanwhile, the separation layer may be an electrolyte layer or a separator.

Herein, the electrolyte layer may include an electrolyte selected from the group consisting of a gel polymer electrolyte using PEO, PVdF, PVdF-HFP, PMMA, PAN or PAVc; a solid electrolyte using PEO, polypropylene oxide (PPO), polyethylene imine (PEI), polyethylene sulfide (PES) or polyvinyl acetate (PAVc); and the like.

In addition, the separator may be a porous polymer substrate made of a polyolefin polymer selected from the group consisting of an ethylene homopolymer, propylene homopolymer, ethylene-butene copolymer, ethylene-hexene copolymer and ethylene-methacrylate copolymer; a porous polymer substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate; a porous substrate formed of a mixture of inorganic particles and a binder polymer; or a separator provided with a porous coating layer formed of a mixture of inorganic particles and a binder polymer on at least one surface of the porous polymer substrate.

Herein, the porous polymer substrate may be a porous polymer film substrate or a porous non-woven web substrate.

Meanwhile, the cable-type secondary battery according to an embodiment of the present disclosure may further include a protective coating formed to surround the outer surface of the sheet-form outer electrode.

Herein, the protective coating may include a polymer resin.

Herein, the polymer resin may include any one selected from the group consisting of PET, PVC, HDPE and epoxy resin, or a combination thereof.

In addition, the protective coating may further include a water barrier layer, which may include aluminum or a liquid polymer.

Meanwhile, the cable-type electrode assembly according to the present disclosure may include at least two inner electrodes disposed in parallel with each other, and a separation layer surrounding the outer surfaces of the inner electrodes to prevent a short-circuit between electrodes.

Advantageous Effects

According to the present disclosure, when a cable-type secondary battery including a sheet-form outer electrode satisfies a predetermined condition, it is possible to minimize a distance among an inner electrode, a separation layer and an outer electrode forming the cable-type secondary battery, thereby improving the performance, including life characteristics and output, of the cable-type secondary battery.

In addition, since the inner electrode, separator and the outer electrode are in close contact with each other, it is possible to further improve the flexibility of the cable-type secondary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DESCRIPTION OF MAIN ELEMENTS

10: cable-type electrode assembly
20: sheet-form outer electrode
21: outer current collector
100: cable-type secondary battery

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
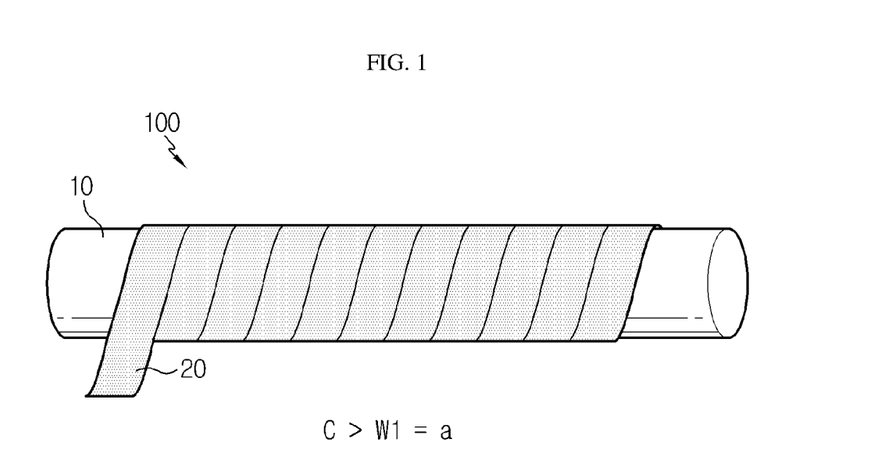
FIG. 1 is a schematic perspective view illustrating the cable-type secondary battery according to an embodiment of the present disclosure.
Figure 2:
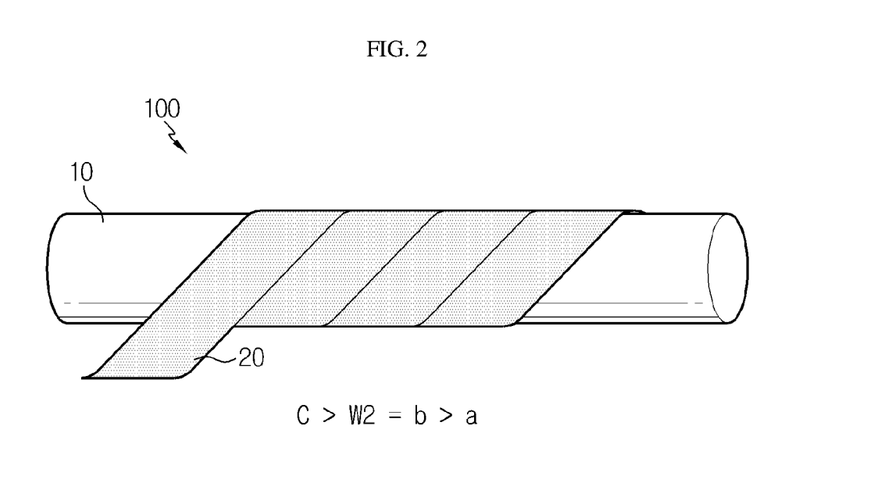
FIG. 2 is a schematic perspective view illustrating the cable-type secondary battery according to another embodiment of the present disclosure.
Figure 3:
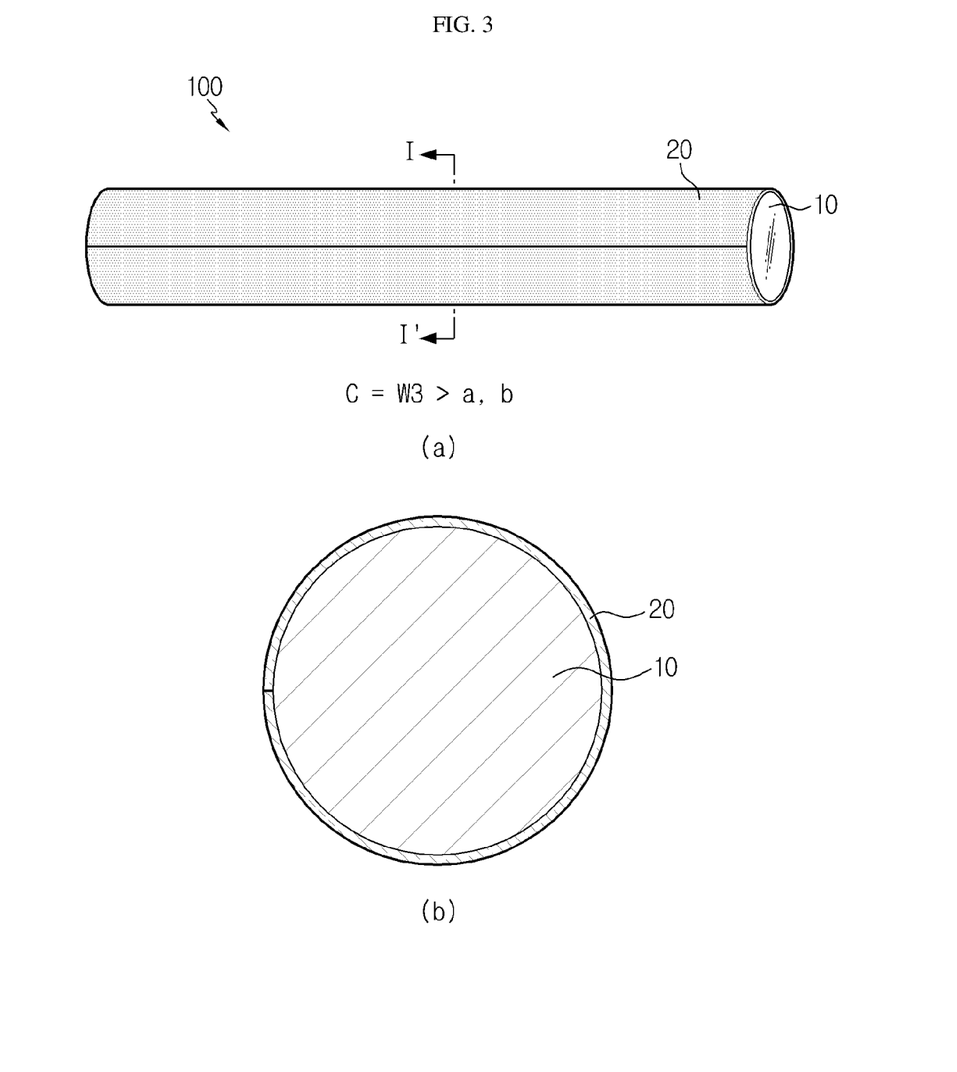
FIG. 3 is a schematic perspective view illustrating the cable-type secondary battery according to still another embodiment of the present disclosure.

FIG. 1-FIG. 3 are schematic perspective views each illustrating the cable-type secondary batteries according to an embodiment of the present disclosure.

Referring to FIG. 1-FIG. 3, the cable-type secondary battery 100 according to an embodiment of the present disclosure includes a cable-type electrode assembly 10 including an inner electrode and a separation layer surrounding the outer surface of the inner electrode to prevent a short-circuit between electrodes; and a sheet-form outer electrode 20 surrounding the outer surface of the cable-type electrode assembly 10, and satisfies the mathematical formula of $C \geq W$ (wherein C is the circumference of the section perpendicular to the longitudinal direction of the cable-type electrode assembly, and W is the width of the sheet-form outer electrode).

Unlike the present disclosure, when $C<W$, the sheet-form outer electrode should be wound while it is overlapped with the outer surface of the cable-type electrode assembly. When winding is carried out with no overlap, the sheet-form outer electrode cannot be formed skin-tightly on the outer surface of the cable-type electrode assembly and cannot maintain its structure.

When the outer electrode is wound with overlapping, lithium ions cannot be transferred to the outer electrode smoothly, and thus it is difficult to realize the theoretical capacity of the battery. In addition, in order to realize a desired capacity while satisfying a capacity balance (NP ratio) between a positive electrode and a negative electrode, it is necessary to form the outer electrode layer to have a larger thickness, considering the overlapped portion of the outer electrode, which leads to waste of materials and an increase in thickness of the outer electrode and a decrease in energy density per unit volume.

However, as shown in FIG. 1 and FIG. 2, when $C>W$ in the above mathematical formula, the sheet-form outer electrode 20 is formed while it helically surrounds the outer surface of the cable-type electrode assembly 10 skin-tightly.

Herein, the term 'helical' means a shape which winds diagonally in a certain range, and generally refers to a shape similar to the shape of a general spring.

In addition, as shown in FIG. 3, when $C=W$ in the above mathematical formula, the sheet-form outer electrode 20 is formed while it skin-tightly surrounds the outer surface of the cable-type electrode assembly 10 in the shape of a pipe.

In other words, when the above mathematical formula is satisfied, a distance between the sheet-form outer electrode 20 and the cable-type electrode assembly 10 including the inner electrode and the separation layer forming the cable-type secondary battery 100 can be minimized, and thus the performance, including life characteristics and output, of the cable-type secondary battery 100 can be improved. In addition, the cable-type electrode assembly 10 including the inner electrode and the separation layer and the sheet-form outer electrode 20 are in close contact with each other. Thus, it is possible to further improve the flexibility of the cable-type secondary battery 100.

Herein, the sheet-form outer electrode 20 may have a strip structure extended in one direction.

Meanwhile, the sheet-form outer electrode 20 may include an outer current collector and an outer electrode active material layer formed on one surface of the outer current collector.

Figure 4:
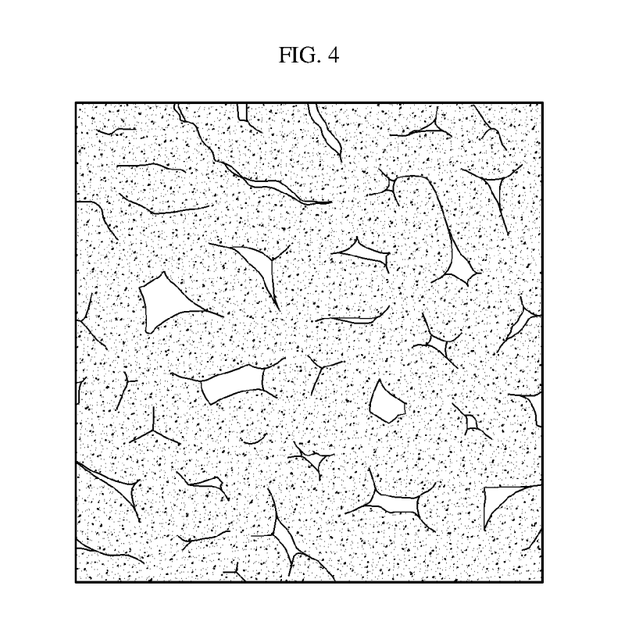
FIG. 4 shows the surface of the mesh-form current collector according to an embodiment of the present disclosure.
Figure 5:
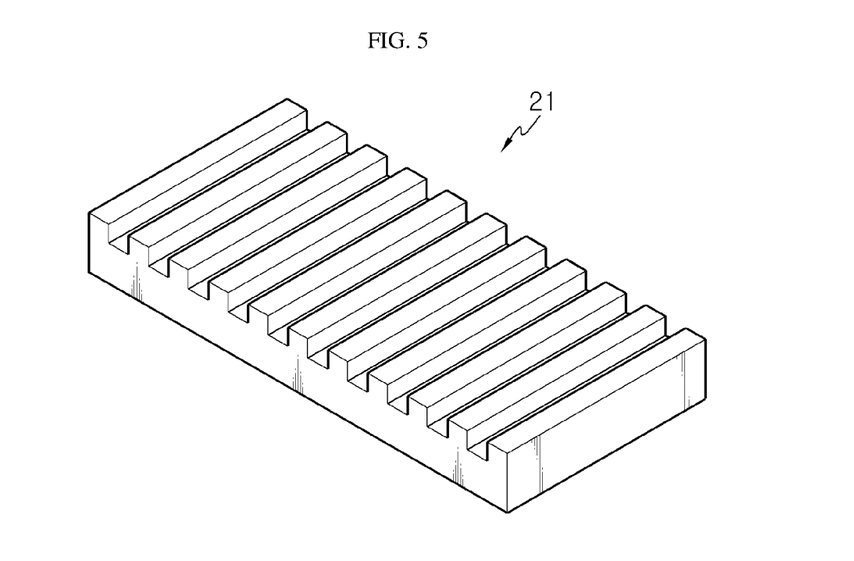
FIG. 5 shows the surface of the collector having a plurality of intrusions according to an embodiment of the present disclosure.
Figure 6:
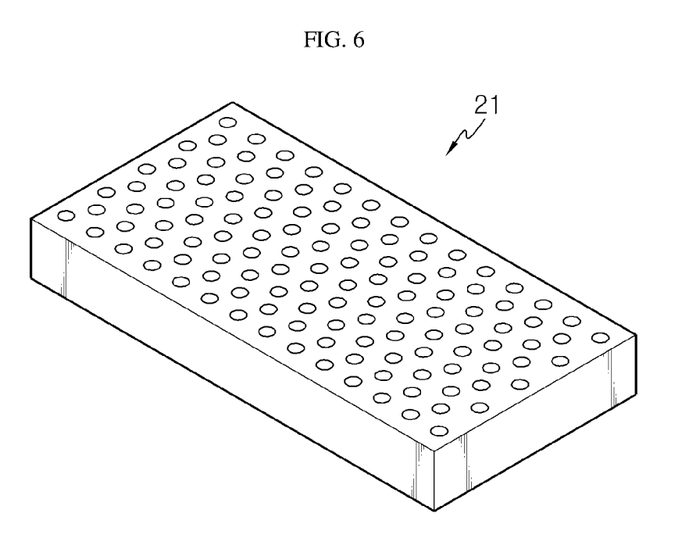
FIG. 6 shows the surface of the collector having a plurality of intrusions according to another embodiment of the present disclosure.

Herein, referring to FIG. 4-FIG. 6, the outer current collector 21 may be a mesh-form current collector, and may further have a plurality of intrusions on at least one surface in order to increase the surface area of the outer current collector 21. Herein, the intrusions may have a continuous pattern or a discontinuous pattern. In other words, the current collector may have a continuous pattern of intrusions spaced apart from each other and formed in the longitudinal direction, or a discontinuous pattern of a plurality of holes. The holes may be circular or polygonal holes. Further, the inner current collector as described below may include a plurality of intrusions in the same manner as the outer current collector 21.

In addition, the sheet-form outer electrode 20 may further include a porous first supporting layer formed on the outer electrode active material layer.

Herein, the first supporting layer may be a mesh-form porous membrane or non-woven web. Such a porous structure facilitates injection of an electrolyte to the outer electrode active material layer. The first supporting layer itself has excellent impregnation ability with an electrolyte to ensure ion conductivity, thereby preventing an increase in internal resistance of the battery and degradation of the performance of the battery.

Herein, the first supporting layer may include any one selected from the group consisting of high density polyethylene, low density polyethylene, linear low density polyethylene, ultrahigh molecular weight polyethylene, polypropylene, polyethylene terephthalate, polybutylene terephthalate, polyester, polyacetal, polyamide, polycarbonate, polyimide, polyetheretherketone, polyether sulfone, polyphenylene oxide, polyphenylene sulfide and polyethylene naphthalate, or a mixture thereof.

Meanwhile, the cable-type secondary battery may further include a conductive material coating layer including a conductive material and a binder on the first supporting layer. The conductive coating layer improves the conductivity of the electrode active material layers and reduces the resistance of the electrodes, thereby preventing degradation of the performance of the battery.

Herein, the conductive material may include any one selected from the group consisting of carbon black, acetylene black, ketjen black, carbon fibers, carbon nanotubes and graphene, or a combination thereof, but is not limited thereto.

In addition, the binder may be any one selected from the group consisting of polyvinylidene fluoride (PVDF), polyvinylidene fluoride-co-hexafluoropropylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxymethyl cellulose, styrene-butadiene rubber, acrylonitrile-styrene-butadiene copolymer and polyimide, or a combination thereof, but is not limited thereto.

In the case of a negative electrode, the negative electrode active material layer has relatively high conductivity, and thus the battery shows performance similar to that of a battery using a conventional negative electrode, even in the absence of the conductive material layer. However, in the case of a positive electrode, the positive electrode active material layer has low conductivity and degradation of the performance may become severe due to an increase in resistance of the electrode. Therefore, it is advisable to apply the conductive material layer to a positive electrode in order to reduce the internal resistance of the battery.

Herein, the conductive material coating layer may include the conductive material and the binder mixed with each other at a weight ratio of 80:20-99:1. When the content of the binder increases, the resistance of the electrode may be increased excessively. However, when the content satisfies the above-defined range, it is possible to prevent an excessive increase in resistance of the electrode. Further, the first supporting layer has a cushioning function to prevent separation of the electrode active material layer. Thus, even when a relatively small amount of binder is used, the flexibility of the electrode is ensured without significant interruption.

In addition, a porous coating layer including a mixture of inorganic particles and a binder polymer may be further formed on the first supporting layer.

Herein, in the porous coating layer including a mixture of inorganic particles and a binder polymer, the binder polymer attaches the inorganic particles (i.e., connects and fixes the inorganic particles to each other) so that the inorganic particles may be bound with each other. In addition, the porous coating layer is maintained so that they are bound with the first supporting layer by the polymer binder. The inorganic particles in the porous coating layer are in contact with each other substantially in a closed packed or densely packed structure, and the interstitial volumes formed among the inorganic particles that are in contact with each other become the pores of the porous coating layer.

Meanwhile, the sheet-form outer electrode 20 may further include a second supporting layer formed on the other surface of the outer current collector 21.

The first supporting layer and the second supporting layer that may be additionally formed on the outer surface of the sheet-form outer electrode 20 function to prevent the problem of cracking on the surface of the outer electrode active material layer.

Herein, the second supporting layer may be a polymer film, and the polymer film may include any one selected from the group consisting of polyolefin, polyester, polyimide and polyamide, or a combination thereof.

Meanwhile, the sheet-form outer electrode 20 may further include a conductive layer interposed between the outer electrode active material layer and the first supporting layer and including a conductive material and a binder.

Herein, the conductive layer may be formed by mixing the conductive material with the binder at a weight ratio of 1:10-8:10. Additionally, the conductive layer may have a porous structure to facilitate injection of an electrolyte to an electrode active material layer. Herein, the pores formed in the conductive layer may have a size of 0.01-5 μm and a porosity of 5-70%.

Meanwhile, the inner electrode may be provided with at least one inner current collector and an inner electrode active material layer formed on the surface of the inner current collector.

When external force, such as bending or distortion, is applied to a cable-type secondary battery, the electrode active material layer may be separated from the current collector. Therefore, a large amount of binder ingredients is incorporated to the electrode active material layer for the purpose of the flexibility of the electrode. However, such a large amount of binder causes swelling in the presence of an electrolyte and thus may be separated from the current collector with ease, resulting in degradation of the performance of a battery.

Therefore, the inner current collector or outer current collector may further include a primer coating layer containing a conductive material and a binder in order to improve the adhesion between the electrode active material layer and the current collector. The conductive material and the binder used herein may be the same as described above.

In addition, in the inner electrode, the inner electrode active material layer may be formed on the whole surface of the inner current collector. Otherwise, the inner electrode active material layer may be formed to surround the outer surface of the wound inner current collector.

In addition, the inner electrode may further include a polymer supporting layer formed on the surface of the inner electrode active material layer.

When the polymer supporting layer is formed on the surface of the inner electrode active material layer of the inner electrode according to an embodiment of the present disclosure, generation of cracking on the surface of the inner electrode active material is prevented significantly, even when the cable-type secondary battery is bent by external force, etc. Thus, separation of the inner electrode active material layer is prevented significantly, thereby providing a battery with more improved performance. Further, the polymer supporting layer may have a porous structure. In this case, it is possible to facilitate injection of an electrolyte to the inner electrode active material layer, thereby preventing an increase in resistance of the electrode.

Herein, the polymer supporting layer may include a polar linear polymer, oxide-based linear polymer or a mixture thereof.

Herein, the polar linear polymer may be any one selected from the group consisting of polyacrylonitrile, polyvinyl chloride, polyvinylidene fluoride (PVDF), polyvinylidene fluoride-co-hexafluoro propylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate and poly-p-phenylene terephthalamide, or a combination thereof.

In addition, the oxide-based linear polymer may be any one selected from the group consisting of polyethylene oxide, polypropylene oxide, polyoxymethylene and polydimethylsiloxane, or a combination thereof.

In addition, the polymer supporting layer may be a porous polymer layer having a pore size of 0.01-10 μm and a porosity of 5-95%.

Further, the porous structure of the porous polymer layer may be formed through phase transition or phase separation using a non-solvent during the preparation.

For example, a polymer, polyvinylidene fluoride-hexafluoropropylene, is added to acetone functioning as a solvent to provide a solution having a solid content of 10 wt %. Then, water or ethanol as a non-solvent is added to the above solution in an amount of 2-10 wt % to obtain a polymer solution.

While the polymer evaporates after its coating, phase transition occurs so that the region occupied by the non-solvent becomes pores in the phase separated parts of the non-solvent and the polymer. Therefore, it is possible to control the pore size according to the solubility of the non-solvent and polymer and the content of the non-solvent.

Meanwhile, the inner current collector may be made of stainless steel, aluminum, nickel, titanium, baked carbon or copper; stainless steel surface-treated with carbon, nickel, titanium or silver; aluminum-cadmium alloy; a non-conductive polymer surface-treated with a conductive material; or a conductive polymer.

Herein, the current collector functions to collect the electrons generated by the electrochemical reaction of an electrode active material or to supply the electrons required for electrochemical reaction. In general, such a current collector uses a metal, such as copper or aluminum. Particularly, when using a polymer conductor including a non-conductive polymer surface-treated with a conductive material or a polymer conductor, it is possible to provide relatively higher flexibility as compared to the current collector using a metal, such as copper or aluminum. In addition, a polymer current collector may be used instead of a metal current collector to accomplish weight lightening of a battery.

The conductive material may be any one selected from the group consisting of polyacetylene, polyaniline, polypyrrole, polythiophene, polysulfur nitride, indium tin oxide (ITO), silver, palladium and nickel, and the conductive polymer may include polyacetylene, polyaniline, polypyrrole, polythiophene, polysulfur nitride, or the like. However, there is no particular limitation in the type of non-conductive polymer used for the current collector.

Meanwhile, the outer current collector may be made of stainless steel, aluminum, nickel, titanium, baked carbon or copper; stainless steel surface-treated with carbon, nickel, titanium or silver; aluminum-cadmium alloy; a non-conductive polymer surface-treated with a conductive material; a conductive polymer; metal paste including metal powder which is Ni, Al, Au, Pd/Ag, Cr, Ta, Cu, Ba or ITO; or carbon paste containing carbon powder which is graphite, carbon black or a carbon nanotube.

Meanwhile, the inner electrode may have a hollow structure having a space therein.

Herein, the inner electrode may include at least one helically wound wire-form inner current collector or at least one helically wound sheet-form inner current collector.

Otherwise, the inner electrode may include at least two helically wound wire-form inner current collectors crossing each other.

In addition, an inner electrode current collector core portion may be formed in the space formed in the inner electrode.

Herein, the inner electrode current collector core portion may be formed of carbon nanotubes, stainless steel, aluminum, nickel, titanium, baked carbon; copper; stainless steel surface-treated with carbon, nickel, titanium or silver; aluminum-cadmium alloy; a non-conductive polymer surface-treated with a conductive material; or a conductive polymer.

In addition, a lithium ion supplying core portion including an electrolyte may be formed in the space formed in the inner electrode.

Herein, although there is no particular limitation in the type of the electrolyte, the electrolyte may be selected from the group consisting of: a non-aqueous electrolyte using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone, sulfolane, methyl acetate (MA) or methyl propionate (MP); a gel polymer electrolyte using PEO, PVdF, PVdF-HFP, PMMA, PAN or PVAc; and a solid electrolyte using PEO, polypropylene oxide (PPO), polyethylene imine (PEI), polyethylene sulfide (PES) or polyvinyl acetate (PVAC). In addition, the electrolyte may further include a lithium salt, such as $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate or lithium tetraphenylborate. The lithium ion supplying core portion may include an electrolyte alone. In the case of a liquid electrolyte, the lithium ion supplying core portion may be formed by using a porous carrier.

Herein, the lithium ion supplying core portion may include a gel polymer electrolyte and a support.

In addition, the lithium ion supplying core portion may include a liquid electrolyte and a porous carrier.

Further, a filler core portion may be formed in the space formed in the inner electrode.

In addition to the materials forming the above-mentioned inner electrode current collector core portion and lithium ion supplying core portion, the filler core portion may include a material capable of improving various properties of a cable-type secondary battery, such as a polymer resin, rubber and inorganic materials, in various shapes, such as a wire-, fiber-, powder-, mesh- or a foam-like shape.

The inner electrode may be a negative electrode or positive electrode, and the outer electrode may be a positive electrode or negative electrode corresponding thereto.

The electrode active material layers function to transfer ions through a current collector and such ion transfer results from the interaction through the intercalation of ions from the electrolyte layer and deintercalation of ions toward the electrolyte layer.

Such electrode active material layers may be classified into a negative electrode active material layer and a positive electrode active material layer.

Particularly, when inner electrode is a negative electrode and the outer electrode is a positive electrode, the inner electrode active material may include, as a negative electrode material, any one active material particle selected from the group consisting of carbonaceous materials, such as natural graphite and artificial graphite; metals (Me), such as lithium-containing titanium composite oxide (LTO), Si, Sn, Li, Zn, Mg, Cd, Ce, Ni or Fe; alloys of the metals (Me); oxides (MeOx) of the metals (Me); and composites of the metals with carbon, or a mixture thereof, while the outer electrode active material may include, as a positive electrode material, any one active material particle selected from the group consisting of $LiCoO_2$, $LiNiO_2$, $LiMn_2O_4$, $LiCoPO_4$, $LiFePO_4$, $LiNiMn\ CoO_2$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and $0\leq x<0.5$, $0\leq y<0.5$, $0\leq z<0.5$, $0<x+y+z\leq1$), or a mixture thereof.

In addition, when the inner electrode is a positive electrode and the outer electrode is a negative electrode, the inner electrode active material becomes a positive electrode active material layer and the outer electrode active material layer becomes a negative electrode active material layer.

The electrode active material layer includes an electrode active material layer, a binder and a conductive material, and is bound to a current collector to form an electrode.

Meanwhile, the separation layer may be an electrolyte layer or a separator.

The electrolyte layer functioning as an ion channel may include a gel polymer electrolyte using PEO, PVdF, PVdF-HFP, PMMA, PAN or PAVc; a solid electrolyte using PEO, polypropylene oxide (PPO), polyethylene imine (PEI), polyethylene sulfide (PES) or polyvinyl acetate (PAVC); and the like. Preferably, the matrix for the solid electrolyte includes a polymer or ceramic glass as a fundamental skeleton. In the case of a general polymer electrolyte, ions may be transported very slowly in terms of reaction rate even though the ion conductivity is satisfied. Thus, it is preferred to use a gel type polymer electrolyte facilitating ion transport rather than a solid electrolyte. Such a gel type polymer electrolyte does not have good mechanical properties and thus may include a support in order to supplement mechanical properties. The support used herein may include a porous support or cross-linked polymer. The electrolyte layer according to the present disclosure also functions as a separator, and thus use of an additional separator may be avoided.

The electrolyte layer according to the present disclosure may further include a lithium salt. Such a lithium salt can improve ion conductivity and reaction rate. Non-limiting examples of the lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$ NLi, chloroborane lithium, lower aliphatic lithium carboxylate and lithium tetraphenylborate.

Although there is no particular limitation, the separator may be a porous polymer substrate made of a polyolefin polymer selected from the group consisting of an ethylene homopolymer, propylene homopolymer, ethylene-butene copolymer, ethylene-hexene copolymer and ethylene-methacrylate copolymer; a porous polymer substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate; a porous substrate formed of a mixture of inorganic particles and a binder polymer; or a separator provided with a porous coating layer formed of a mixture of inorganic particles and a binder polymer on at least one surface of the porous polymer substrate. Herein, the porous polymer substrate may be a porous polymer film substrate or porous non-woven web substrate.

Herein, in the porous coating layer formed of a mixture of inorganic particles and a binder, the binder polymer attaches the inorganic particles (i.e., connects and fixes the inorganic particles to each other) so that the inorganic particles may be bound with each other. In addition, the porous coating layer is maintained so that they are bound with the first supporting layer by the polymer binder. The inorganic particles in the porous coating layer are in contact with each other substantially in a closed packed or densely packed structure, and the interstitial volumes formed among the inorganic particles that are in contact with each other become the pores of the porous coating layer.

Particularly, in order to transfer lithium ions of the lithium ion supplying core portion easily to the outer electrode, it is preferred to use a separator including a non-woven web material corresponding to a porous polymer substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate.

According to the present disclosure, a protective coating may be further used. The protective coating is formed on the outer surface of the outer current collector in order to protect the electrode against water in the air and external impact. The protective coating may include a conventional polymer resin including a water barrier layer. Herein, the water barrier layer may include aluminum or a liquid crystal polymer having excellent water barrier property, and the polymer resin may include PET, PVC, HDPE or epoxy resin.

Meanwhile, the cable-type electrode assembly according to the present disclosure may include at least two inner electrodes disposed in parallel with each other, and a separation layer surrounding the outer surfaces of the inner electrodes to prevent a short-circuit between electrodes.

Since the cable-type secondary battery is provided with a plurality of inner electrodes, it is possible to adjust the loading amount of an electrode active material layer and the battery capacity with ease by controlling the number of inner electrodes. In addition, since the cable-type secondary battery is provided with a plurality of electrodes, it is possible to prevent a possibility of disconnection.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description. Therefore, the examples described herein are for illustrative purposes only and not intended to limit the scope of this disclosure. The scope of the present disclosure is defined by the following claims, and it is to be understood that various changes and modifications within the equivalents thereof fall within the scope of the present disclosure.

What is claimed is:

1. A cable-type secondary battery which comprises:
   a cable-type electrode assembly comprising an inner electrode and a separation layer surrounding the outer surface of the inner electrode to prevent a short-circuit between electrodes; and
   a sheet-form outer electrode helically surrounding the outer surface of the cable-type electrode assembly, and satisfies the mathematical formula of C>W (wherein C is the circumference of the section perpendicular to the longitudinal direction of the cable-type electrode assembly, and W is the width of the sheet-form outer electrode),
   wherein the sheet-form outer electrode comprises an outer current collector and an outer electrode active material layer integrally formed on one surface of the outer current collector, such that the outer current collector and the outer electrode active material layer together helically surround the outer surface of the cable-type electrode assembly.

2. The cable-type secondary battery according to claim 1, wherein the sheet-form outer electrode has a strip structure extended in one direction.

3. The cable-type secondary battery according to claim 1, wherein the sheet-form outer electrode further comprises a porous first supporting layer formed on the outer electrode active material layer.

4. The cable-type secondary battery according to claim 3, which further comprises a porous coating layer comprising a mixture of inorganic particles and a binder polymer, on the first supporting layer.

5. The cable-type secondary battery according to claim 1, wherein the sheet-form outer electrode further comprises a second supporting layer formed on the other surface of the outer current collector.

6. The cable-type secondary battery according to claim 1, wherein the inner electrode is provided with at least one inner current collector and an inner electrode active material layer formed on the surface of the inner current collector.

7. The cable-type secondary battery according to claim 6, wherein the inner current collector further comprises a primer coating layer including a conductive material and a binder.

8. The cable-type secondary battery according to claim 6, wherein the inner electrode comprises the inner electrode active material layer formed on the whole surface of the inner current collector, or the inner electrode active material layer formed to surround the outer surface of the inner current collector on which it is wound.

9. The cable-type secondary battery according to claim 1, wherein the inner electrode has a hollow structure having a space therein.

10. The cable-type secondary battery according to claim 9, wherein the inner electrode comprises at least one helically wound wire-form inner current collector or at least one helically wound sheet-form inner current collector.

11. The cable-type secondary battery according to claim 9, wherein an inner electrode current collector core portion, a lithium ion supplying core portion including an electrolyte or a filler core portion is formed in the space formed in the inner electrode.

12. The cable-type secondary battery according to claim 1, wherein the inner electrode is a negative electrode or positive electrode, and the outer electrode is a positive electrode or negative electrode corresponding thereto.

13. The cable-type secondary battery according to claim 1, which further comprises a protective coating formed to surround the outer surface of the sheet-form outer electrode.

14. The cable-type secondary battery according to claim 1, wherein the cable-type electrode assembly comprises at least two inner electrodes disposed in parallel with each other, and a separation layer surrounding the outer surfaces of the inner electrodes to prevent a short-circuit between electrodes.

* * * * *